Patented Apr. 21, 1925.

1,534,167

UNITED STATES PATENT OFFICE.

HENRY M. DEAVITT, OF CHICAGO, ILLINOIS, ASSIGNOR TO CENTRAL CITY CHEMICAL CO., OF CHICAGO, ILLINOIS, A CORPORATION OF ILLINOIS.

COMPOSITION FOR CLEANING PIPES.

No Drawing.   Application filed April 14, 1922.   Serial No. 552,662.

*To all whom it may concern:*

Be it known that I, HENRY M. DEAVITT, a citizen of the United States, and a resident of the city of Chicago, in the county of Cook and State of Illinois, have invented a new and useful Improvement in Compositions for Cleaning Pipes; and I do hereby declare that the following is a full, clear, and exact description of the same.

This invention relates to compositions for use in cleaning and clearing pipes such as sink and drain pipes which have become blocked or foul with grease or similar substances. In the ordinary use of chemicals for this purpose some saponifying agent is employed. This however has the disadvantage that the soap formed is apt to be in a form which will clog the pipes just as effectively as the grease.

It is an object of this invention to provide a composition for use in cleaning pipes which will automatically prevent the formation of a solid mass of soap.

It is a further object of this invention to so proportion the saponifying agents used that the soap resulting shall be of the desired degree of softness.

Other and further important objects of this invention will be apparent from the following specification, which sets forth the invention in its preferred form.

It is well known that caustic soda and caustic potash will both react with a fat to form soap, but the soap formed by caustic potash has a lower melting point and is what is ordinarily called "soft soap", while caustic soda is apt to produce a hard soap. In the preferred method for carrying out the present invention, the two saponifying agents are so proportioned that the resulting soap will be soft enough to be readily removed from the pipe and yet the proportion of caustic potash used will not be large enough to materially increase the cost. While I prefer to employ a mixture of caustic alkalies I may in some cases employ one only.

In addition to the caustic alkalies, I add to my pipe-cleaning composition an element or other chemical which will react with water. For this purpose I prefer to use silicon. This reacts with the water to cause an evolution of hydrogen and at the same time produces considerable heating. The hydrogen by bubbling up through the pipe will stir the mixture and prevent the soap from forming a plug filling the pipe. Also by stirring the solution it will bring fresh parts thereof in contact with the fat at the stopped up point in the pipe so that all of the alkali will get an abundant opportunity to act upon the fat. At the same time the evolution of heat produced by the reaction between the silicon, the alkali, and the water will make the solution hot so that its action upon the fat will be more rapid. It will also tend to melt some of the fat which will assist materially in hurrying the reaction and in clearing the pipe.

It will be evident that while the use of silicon or the like is to be preferred very useful results will be obtained by the use of a mixture of caustic potash and caustic soda alone.

Preferably, I use the alkali in flake or granulated, or coarsely powdered form, and the silicon in the form of a very fine powder. The silicon should be fine enough to pass through a sieve having two hundred meshes to the inch.

In compounding the mixture, 10 pounds by weight of caustic soda in a coarsely granulated or flake form, 4 parts by weight of caustic potash, also in a flake or granulated form, and 1 part by weight of silicon in a fine form, are mixed together. It is obvious that this procedure may be varied without departing from the spirit of this invention. For example, instead of using the alkali in granulated from, an alkali may be used which has been fused or otherwise prepared and then ground to a powder; or it may be used in coarser states of aggregation, or a coarser alkali and a finer one may be mixed together in any desired portions. Of course the finer the state of aggregation, the more rapid the solution of the alkali and the more rapid its saponifying action. It is also true of the silicon that it will act more rapidly and consequently produce a higher temperature when finely ground. Satisfactory results are obtained with the degree of fineness specified, but coarser conditions of the silicon may be used where a lower temperature or a slower evolution of hydrogen is desired.

I am aware that many other variations in details, both of materials and their condition, may be made without departing from the spirit of this invention, and I therefore do not wish the patent granted to be limited otherwise than necessitated by the prior art.

I claim as my invention:

1. A pipe cleaning mixture comprising ten parts by weight of caustic soda, four parts by weight of caustic potash, and one part by weight of silicon.

2. A pipe cleaning mixture comprising ten parts by weight of caustic soda, four parts by weight of caustic potash, and one part by weight of silicon, the silicon being in a comminuted condition and the caustic alkali substances being coarsely granular.

In testimony whereof I have hereunto subscribed my name in the presence of a subscribing witness.

HENRY M. DEAVITT.

Witness:
LAWRENCE REIBSTEIN.